United States Patent
Yu et al.

(10) Patent No.: US 7,613,754 B2
(45) Date of Patent: Nov. 3, 2009

(54) CONTEMPORANEOUS SYMBOLIC AND NUMERIC PRESENTATION

(75) Inventors: Jinsong Yu, Sammamish, WA (US); William Ben Kunz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 11/171,143

(22) Filed: Jun. 29, 2005

(65) Prior Publication Data

US 2006/0235911 A1    Oct. 19, 2006

Related U.S. Application Data

(60) Provisional application No. 60/671,730, filed on Apr. 15, 2005.

(51) Int. Cl.
*G06F 3/14* (2006.01)
(52) U.S. Cl. ........................................ 708/174
(58) Field of Classification Search ............. 708/174
See application file for complete search history.

(56) References Cited

U.S. PATENT DOCUMENTS

| | | | | |
|---|---|---|---|---|
| 5,210,708 A * | 5/1993 | Negishi | ...... | 708/174 |
| 5,289,394 A * | 2/1994 | Lapeyre | ...... | 708/142 |
| 5,655,136 A | 8/1997 | Morgan | | |
| 6,081,819 A * | 6/2000 | Ogino | ...... | 708/174 |
| 6,829,626 B2 * | 12/2004 | Stoutemyer | ...... | 708/161 |
| 6,854,001 B2 * | 2/2005 | Good et al. | ...... | 708/174 |
| 6,956,560 B2 | 10/2005 | Brothers | | |

* cited by examiner

*Primary Examiner*—David H Malzahn
(74) *Attorney, Agent, or Firm*—Lee & Hayes, PLLC

(57) ABSTRACT

A piece of software running on either a computer or a calculator for receiving a mathematical expression is described. The mathematical expression is evaluated to obtain its symbolic result. If the symbolic result can be resolved to its numeric result, the software executes to obtain the numeric result. The software displays contemporaneously the symbolic result and the numeric result.

17 Claims, 9 Drawing Sheets

*Fig.3A.*

| INPUT | $3^{50} - 1$ |
|---|---|
| SYMBOLIC | 717897987691852588770248 |
| NUMERIC | $7.17898 \cdot 10^{23}$ |

| INPUT | $\sqrt{18} + \sqrt{12} - \sqrt{125}$ |
|---|---|
| SYMBOLIC | $-5 \cdot \sqrt{5} + 2 \cdot \sqrt{3} + 3 \cdot \sqrt{2}$ |
| NUMERIC | $-3.473598$ |

| INPUT | $LOG_{1000} 100000$ |
|---|---|
| SYMBOLIC | $\dfrac{5}{3}$ |
| NUMERIC | $1.666667$ |

306

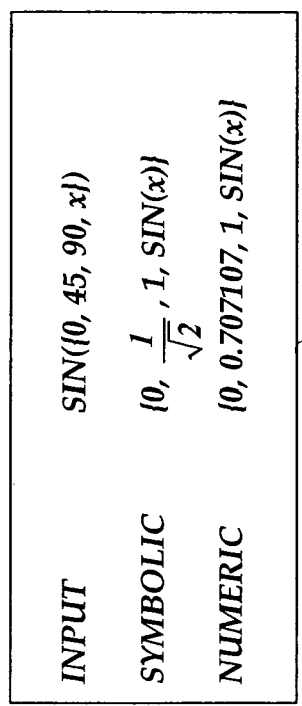
*Fig.3D.*
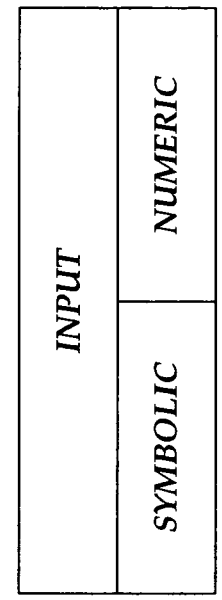
*Fig.3E.*
*Fig.3F.*

CONTEMPORANEOUS SYMBOLIC AND NUMERIC PRESENTATION

CROSS-REFERENCE TO RELATED APPLICATION

This application claims the benefit of U.S. Provisional Application No. 60/671,730, filed Apr. 15, 2005, which is incorporated herein by reference.

FIELD OF THE INVENTION

The present invention is generally related to software.

BACKGROUND

Conventional mathematical software is available to run on personal computers and high-end handheld graphing calculators. These pieces of mathematical software are capable of performing symbolic and numeric calculations. Symbolic calculation refers to the calculation carried out using signs that represent operations, quantities, elements, relations, or qualities without any approximation or rounding errors. Numbers that cannot be represented precisely as integer or floating point numbers are represented as symbols. Unknown variables representing an unknown quantity are allowed to participate in calculations as symbols. This is the basis for the generalization of arithmetic in which letters represent numbers. Mathematical rules are applied during symbolic calculation to simplify the input.

Numeric calculation refers to calculations carried out in which quantities are known, in either integer or floating point number format. Numeric calculations cannot include unknown variables. In many cases rounding errors will occur and the result is approximate rather than exact. There are two reasons for rounding errors to occur. First, some numbers cannot be precisely represented as either integer or floating point numbers. For example, the square root of 2 cannot be represented precisely with a limited number of digits (1.4142135623730950488016887242097 . . . ). In this case, any representation of such a number in integer or floating point numbers is approximate with rounding errors.

Second, if there is a limitation in the number of digits in floating point numbers, certain calculations will exceed the limitation causing truncation to occur, which makes the result approximate because of rounding errors. Here is an example to illustrate this situation: assume floating point numbers are limited to containing at most four decimal digits. In such a case, the mathematical expression "1000+0.1" will result in 1000 because the exact result 1000.1 exceeds the four decimal digits limitation, causing truncation and the loss of the insignificant part of the number. In calculators and computers today, floating point numbers can carry many more digits, but because of finite memory resources, there will always be a limit, regardless of memory size.

There is a relationship between a symbolic calculation and its corresponding numeric calculation. Many users of conventional mathematical software would gain better mathematical insight into this relationship if a symbolic result could be contemporaneously displayed with the numeric result. However, conventional mathematical software does not display both symbolic and numeric results at the same time in response to users' input. Conventional mathematical software, if it has the capability, typically displays the symbolic result by default. Only when the user issues a special command does the numeric result display, in which case the numeric result supplants the display of the symbolic result. FIG. 1 illustrates this problem.

As illustrated in FIG. 1, a mathematical expression 102, such as sin (45), can be entered into a calculator 104. Sine is one of the fundamental trigonometric ratios in mathematics. In a right-sided triangle, the value of the sine (usually abbreviated as "sin") of an acute angle is equal to the length of the side of the triangle opposite the angle divided by the length of the hypotenuse. Using a conventional calculator, such as the calculator 104, the mathematical expression sin (45) is resolved into a symbolic result 106

$$\left(\frac{1}{\sqrt{2}}\right).$$

A beginner in mathematics cannot readily appreciate the meaning of the symbolic result $$\left(\frac{1}{\sqrt{2}}\right)$$

without seeing a corresponding numeric result. To resolve the symbolic result $$\left(\frac{1}{\sqrt{2}}\right)$$

to a numerical result, a user of the calculator 104 issues a special command, such as by pushing a specific button on the calculator 104, to cause the symbolic result $$\left(\frac{1}{\sqrt{2}}\right)$$

to resolve to the numeric result 108 "0.707107". There is a relationship between the symbolic result 106

$$\left(\frac{1}{\sqrt{2}}\right)$$

and the numeric result 108 "0.707107," but conventional calculator 104 would jettison the display of the symbolic result to show the numeric result. Thus, it is difficult for beginners in mathematics to appreciate the relationship between symbolic results and numeric results.

SUMMARY

In accordance with this invention, a method, computer, and computer-readable medium is provided. The method form of the invention includes a method for presenting mathematical calculations, which comprises receiving a mathematical expression as input to a computer-executable program; and displaying contemporaneously a symbolic result based on the resolution of the mathematical expression and a numeric result based on the resolution of symbolic result. The method further comprises displaying a symbolic result if the resolution of the mathematical expression includes one or more unknown variables. The method also comprises displaying a symbolic result if the resolution of the symbolic result includes a result that is an error, infinity, or not a number. The method additionally comprises displaying a symbolic result if the symbolic result is identical to the numeric result. The method yet further comprises displaying a matrix containing both symbolic results and numeric results.

In accordance with further aspects of this invention, a system form of the invention includes a computer for calculating mathematical expressions, which comprises a microprocessor on which a piece of software is executing for receiving a mathematical expression as input and for resolving the mathematical expression to its symbolic result and numeric result; and a display on which the input, the symbolic result, and the numeric result are presented. The system also comprises a user interface screen in which an input is shown on a first line, a symbolic result is shown on a second line below the first line, and the numeric result is shown on a third line below the second line. The system additional comprises a user interface screen in which an input is shown superjacent to a symbolic result and a numeric result, the symbolic result being adjacent to the numeric result. The system further comprises a user interface screen in which an input is shown adjacent to a symbolic result and the symbolic result is shown adjacent to the numeric result. The system yet further comprises a user interface screen in which a symbolic result is shown subjacent to an input and a numeric result, the input being shown adjacent to the numeric result.

The computer-readable medium form of the invention includes a computer-readable medium having executable instructions stored there on for implementing a method for presenting mathematical calculations, which comprises receiving a mathematical expression as input to a computer-executable program; and displaying contemporaneously a symbolic result based on the resolution of the mathematical expression and a numeric result based on the resolution of symbolic result. The method further comprises displaying a symbolic result if the resolution of the mathematical expression includes one or more unknown variables. The method also comprises displaying a symbolic result if the resolution of the symbolic result includes a result that is an error, infinity, or not a number. The method additionally comprises displaying a symbolic result if the symbolic result is identical to the numeric result. The method yet further comprises displaying a matrix containing both symbolic results and numeric results.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A-3D are pictorial diagrams illustrating exemplary user interface screens in which the input, symbolic, and numeric results are displayed;

FIGS. 3E-3H are pictorial diagrams illustrating presentation placement permutations of the input, symbolic, and numeric results.

DETAILED DESCRIPTION

The ability to see both symbolic and numeric results enhances the user experience in many educational scenarios, and enables the user to perform work more quickly with fewer errors. Even when users need only the symbolic results for their work, seeing the numeric results gives users a rough idea of the magnitude of the result. This information can be especially helpful when the result is quite large or quite small and scientific notation is used in numeric display.

Figure 1:
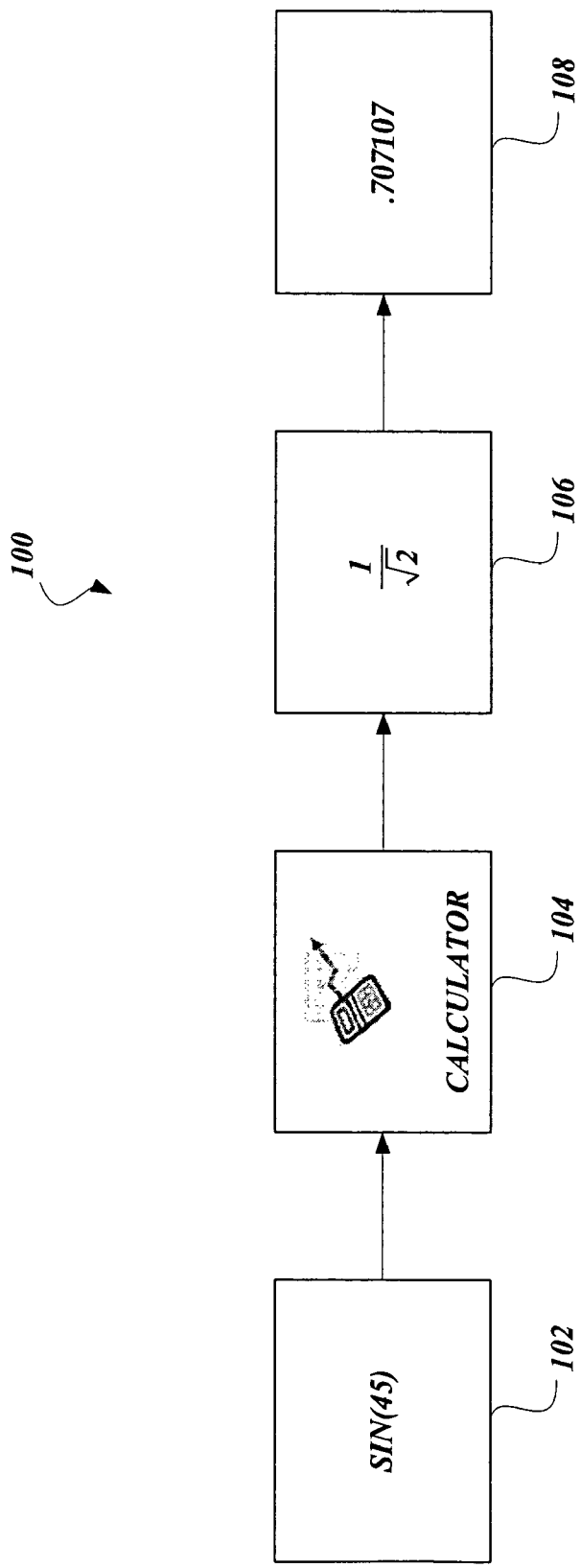
FIG. 1 is a block diagram illustrating the linearity by which conventional calculators display a numeric result and supplant the display of a symbolic result.
Figure 2:
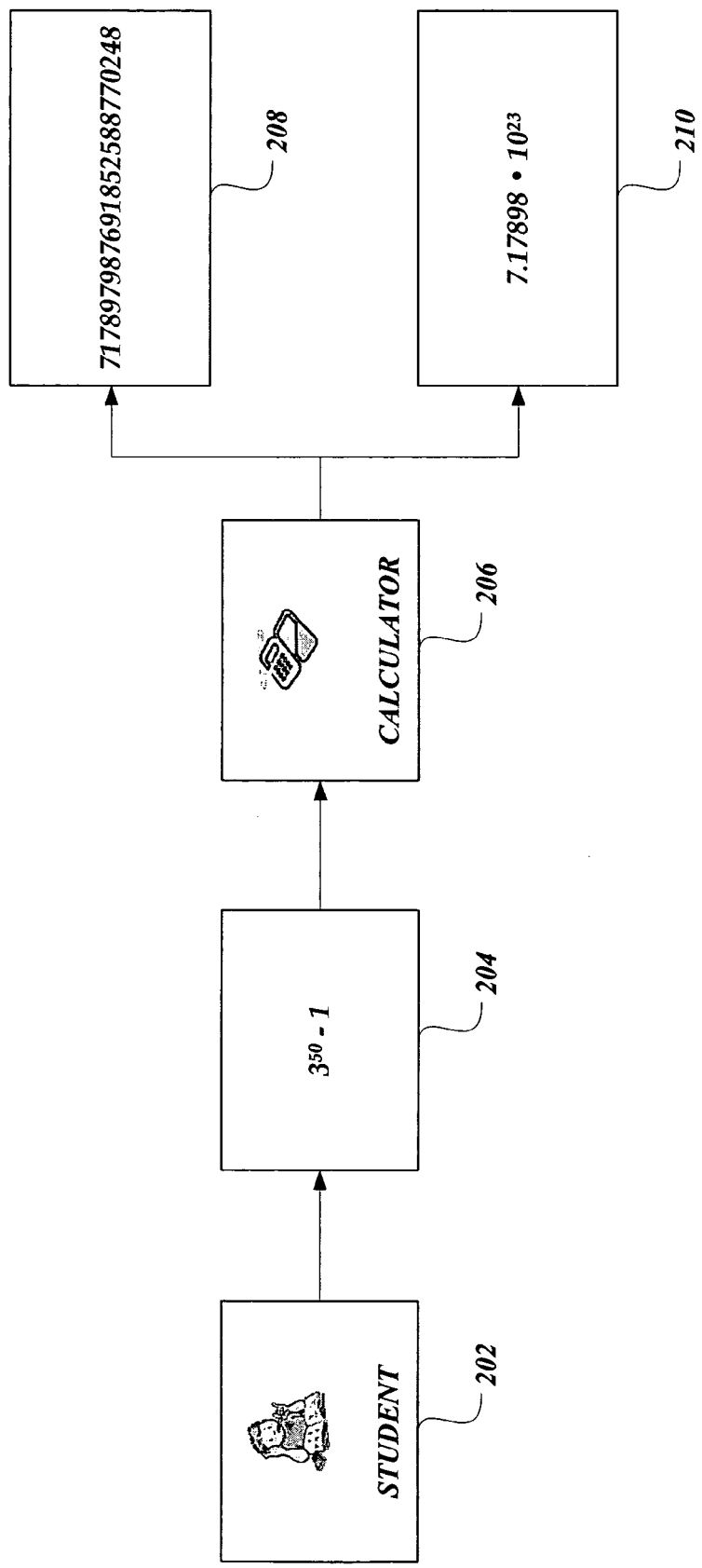
FIG. 2 is a block diagram illustrating an exemplary calculator in which symbolic and numeric results are contemporaneously displayed.

As illustrated in FIG. 2, a student 202 enters a mathematical expression 204, "$3^{50}-1$" into a calculator 206. Various embodiments of the present invention display contemporaneously a symbolic result 208 "717897987691852588770248," and a numeric result 210 "$7.17898 \cdot 10^{23}$." The contemporaneous display of symbolic result 208 and numeric result 210 provides the student 202 with a deeper mathematical insight than displaying only the symbolic result 208 or only the numeric result 210. Additionally, there is educational value in the display of the numeric result 210 contemporaneously with the symbolic result 208 to give the student 202 a sense of the magnitude of the symbolic result 208. FIG. 3A illustrates an exemplary user interface contemporaneously displaying the symbolic result 208 and a numeric result 210.

The input 204, the symbolic result 208, and the numeric result 210 are shown in a user interface screen 302. The user interface screen 302 presents three lines of information. The first line is designated as INPUT and the value of the input is the mathematical expression 204 "$3^{50}-1$". The second line is designated as SYMBOLIC and adjacent to this designation is the symbolic result 208 "717897987691852588770248". The third line includes the designation NUMERIC and the associated numeric result is "$7.17898 \cdot 10^{23}$." A glance at the symbolic result informs the user that the number is 24 digits long. Note that the symbolic result provides the exact number, whereas the numeric result provides an approximation.

FIG. 3B illustrates another exemplary user interface. A user interface screen 304 has three lines of information. The first line is designated as INPUT and contains a mathematical expression "$\sqrt{18}+\sqrt{12}-\sqrt{125}$". The mathematical expression is resolved on the second line designated as SYMBOLIC, which displays a symbolic result "$-5 \cdot \sqrt{5}+2 \quad \sqrt{3}+3 \quad \cdot \sqrt{2}$". The numeric result equivalent to the symbolic result is shown on the third line designated as NUMERIC with a value of "−3.473598." Even if the symbolic result is all that a user needs, the numeric result of the user interface screen 304 shows that the result is a negative number which could be valuable information to the user and save the user from doing an additional comparison. Many pieces of conventional mathematical software that are capable of symbolic calculations show symbolic results by default and users have to issue special commands to get the numeric results. Using various embodiments of the present invention, users no longer need to remember a command or perform extra steps to see numeric results when symbolic results become available. Even in the case where the user desires to see only symbolic results, the presentation of the numeric results may aid in better mathematical understanding of the symbolic results.

The contemporaneous display of both a symbolic result and the numeric result permits the symbolic result to be seen as an intermediary step to get the numeric result, which can confirm users' calculations. For example, FIG. 3C illustrates another user interface screen 306, which includes a first line designated as INPUT and the input mathematical expression "$\log_{1000} 100000$." The mathematical expression shown at the input line is resolved into a symbolic result shown on the second line designated as SYMBOLIC and the symbolic result is "⅔". The third line designated as NUMERIC displays a numeric result, which, in this case, is "1.666667," and is an approximation of the symbolic result "⅔" shown on the second line. For instance, FIG. 3C illustrates the symbolic representation of the input at ⅔. In this example, even if the numeric result "1.666667" is what the user needs, seeing the symbolic result ⅔ reassures the user that the input is correct according to the laws of logarithms.

Various embodiments of the present invention can show combinations of numeric results and symbolic results when a few of the symbolic results do not have sufficient information to resolve to numeric results. See FIG. 3D. A user interface screen 308 includes a first line designated as INPUT which displays a mathematical expression "sin({0, 45, 90, x})". The mathematical expression indicates the application of the sine trigonometric function to each of the angles enclosed by the curly brackets and delimited by the commas. The second line designated as SYMBOLIC displays a symbolic result in the execution of the sine trigonometric function, with the values $$"\left\{\left\{0, \frac{1}{\sqrt{2}}, 1, \sin(x)\right\}\right\}".$$

Related numeric results are shown on the third line designated as NUMERIC with the values "{0, 0.707107, 1, sin(x)}". Because the symbol x cannot yet be resolved, the application of the sine trigonometric function causes the symbolic result "sin(x)" to be displayed along with numeric results "0," "0.707107," and "1".

Figure 3G:
Figure 3H:
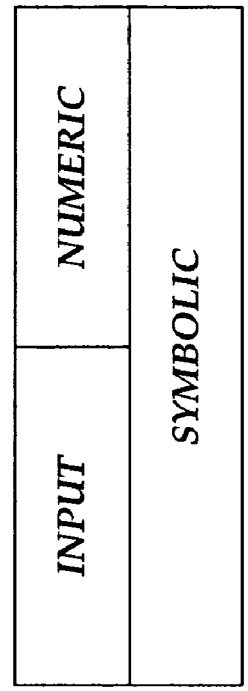
Figure 4A:
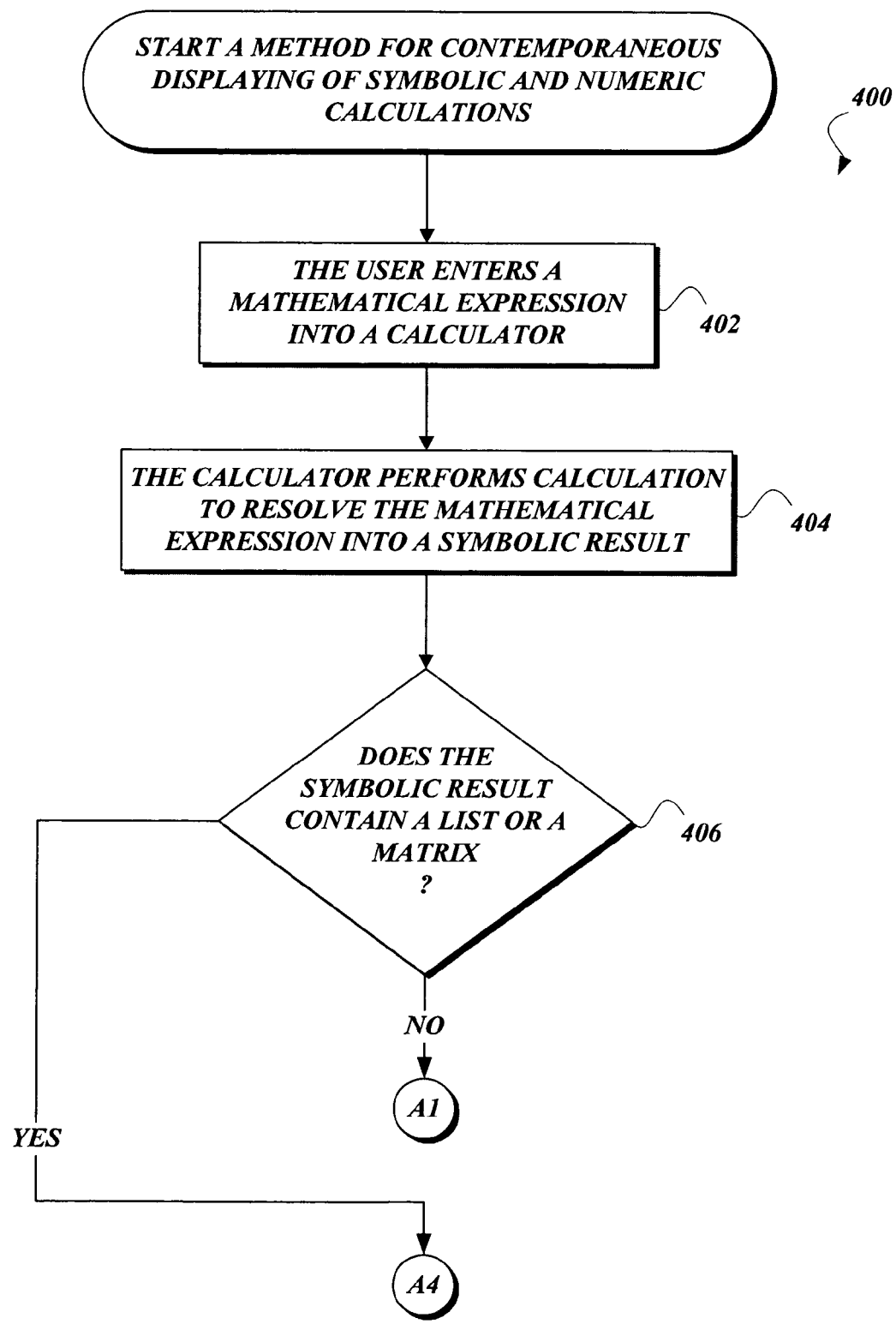
FIGS. 4A-D are process diagrams illustrating a method for contemporaneously displaying symbolic and numeric results.
Figure 4B:
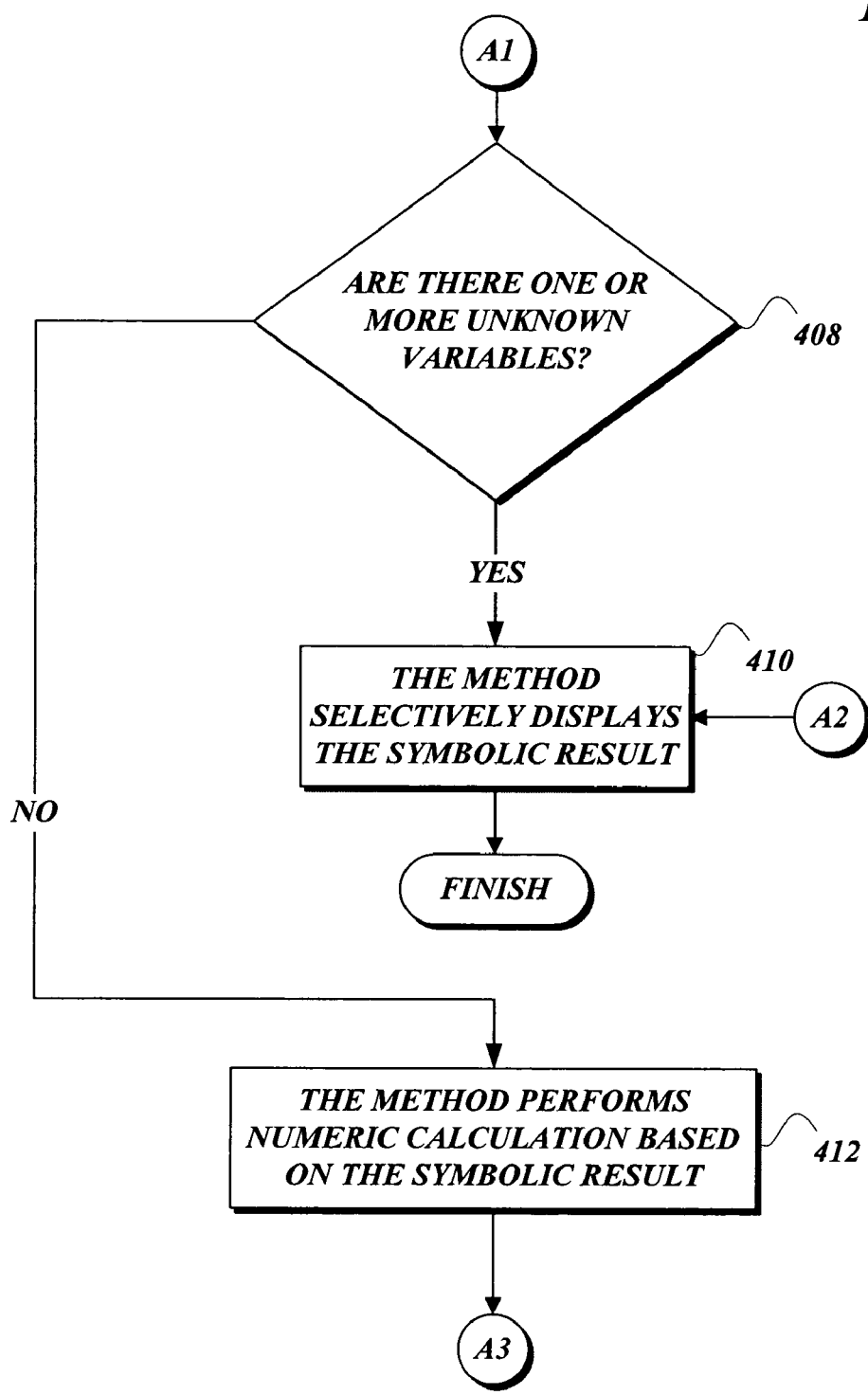
Figure 4C:
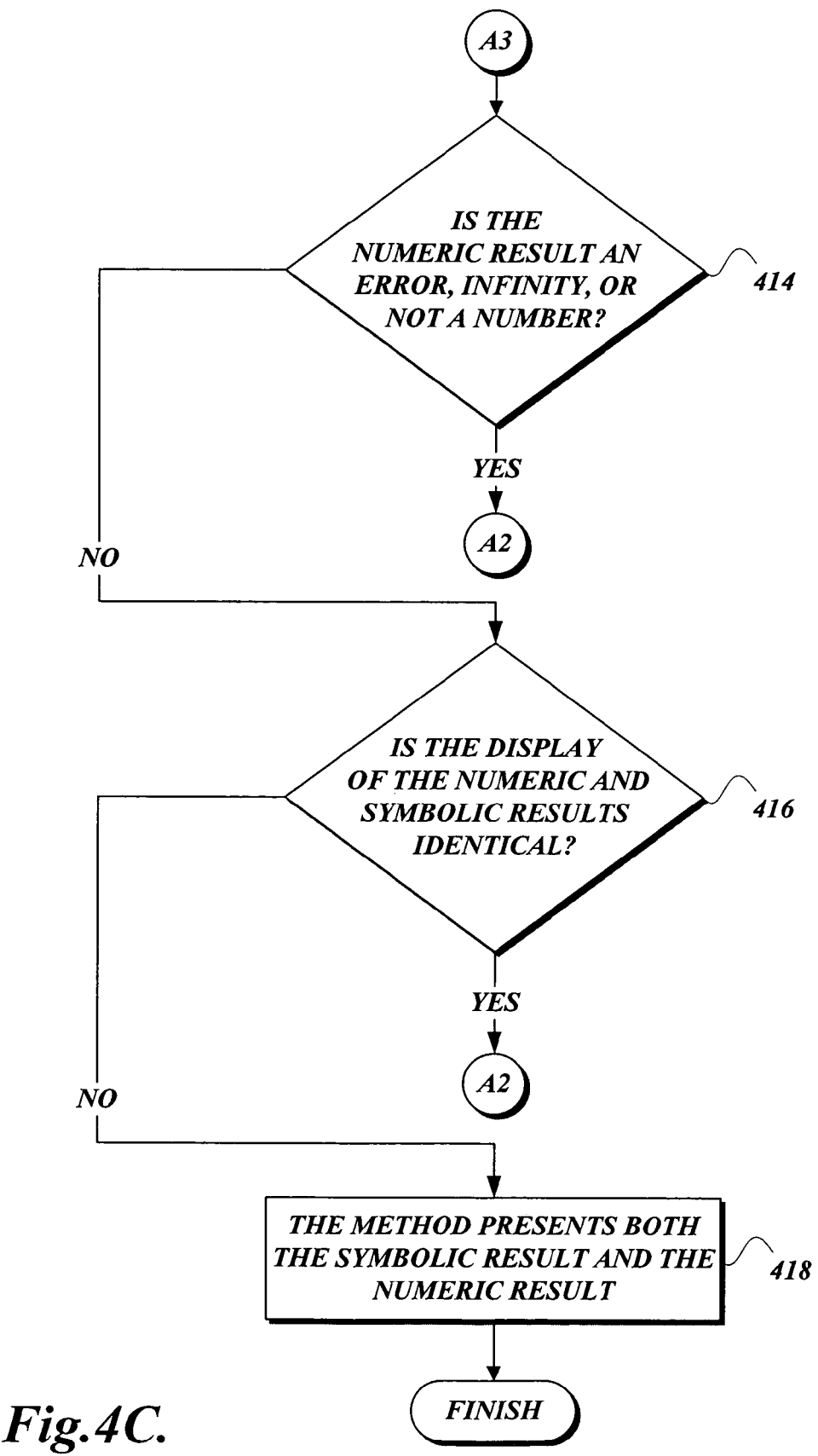
Figure 4D:
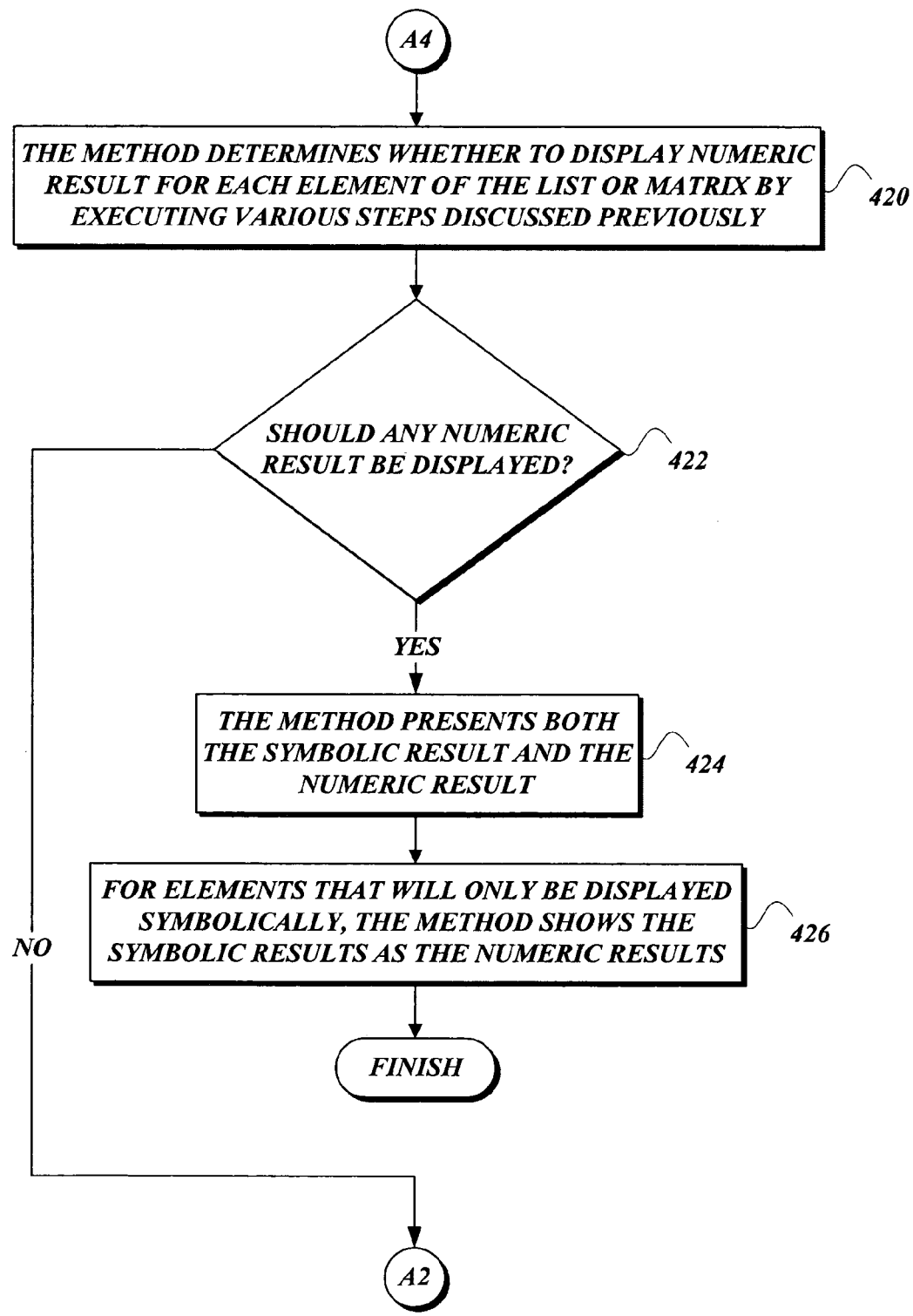

User interface screens 302-308 (See FIGS. 3A-3D) are presented using a format 310 illustrated as FIG. 3E in which the input mathematical expression is shown on a line above a symbolic result, which in turn is shown on a second line, and the numeric result, which is shown on the third line. FIG. 3F illustrates another format permutation 312 for displaying the input, symbolic result, and numeric result. The format permutation 312 displays the input superjacent to the symbolic result and the numeric result. The symbolic result is shown adjacent to the numeric result. FIG. 3G illustrates another format permutation 314 for displaying the input, symbolic result, and numeric result. The input mathematical expression is shown adjacent to the symbolic result, which in turn is shown adjacent to the numeric result. FIG. 3H illustrates as yet a further format permutation 316 for displaying the input, numeric result, and symbolic result. The symbolic result is shown subjacent to the input which is shown adjacent to the numeric result. Permutations 310-316 as shown in FIGS. 3E-3H are a few of many suitable format permutations for contemporaneously presenting the symbolic result together with the numeric result, and are not meant to be limiting. Other suitable format permutations are possible.

FIGS. 4A-4D illustrate a method 400 for contemporaneously displaying symbolic and numeric calculations. From a start block, the method 400 proceeds to block 402 where the user, such as a student, enters a mathematical expression into a calculator. The calculator performs a calculation to resolve the mathematical expression into a symbolic result at block 404. Next, the method 400 proceeds to decision block 406 where a test is performed to determine whether the symbolic result contains a list or a matrix. If the answer to the test at decision block 406 is NO, the method 400 proceeds to a continuation terminal ("terminal A1"). Otherwise, the answer to the test at decision block 406 is YES, and the method 400 proceeds to another continuation terminal ("terminal A4").

From terminal A1 (FIG. 4B), the method 400 proceeds to decision block 408 where a test is performed to determine whether there are one or more unknown variables. If the answer to the test at decision block 408 is YES, the method selectively displays the symbolic result and not the numeric result. See block 410. The method 400 then terminates execution. If the answer to the test at decision block 408 is NO, the method performs numeric calculation based on the symbolic result. See block 412. The method 400 then proceeds to another continuation terminal ("terminal A3").

From terminal A3 (FIG. 4C) the method 400 proceeds to decision block 414 where another test is performed to determine whether the numeric result is an error, infinity, or not a number ("NAN"). If the answer to the test at decision block 414 is YES, the method 400 proceeds to another continuation terminal ("terminal A2"), where it loops back to block 410 and the above-identified processing steps are repeated. Otherwise, the answer to the test at decision block 414 is NO, and the method proceeds to decision block 416 where another test is performed to determine whether the display of the numeric and symbolic results is identical. If the answer is YES to the test at decision block 416, the method proceeds to terminal A2 where it loops back to block 410 and the above-identified processing steps are repeated. Otherwise, the answer to the test at decision block 416 is NO, and the method presents both a symbolic result and numeric result. See block 418. The method 400 then terminates execution.

From terminal A4 (FIG. 4D), the method 400 proceeds to block 420, where the method determines whether to display numeric results for each element of the list or matrix by executing various steps previously discussed. A test is performed at decision block 422 to determine whether any numeric result in the list or matrix should be displayed. If the answer to the test at decision block 422 is YES, the method 400 presents both a symbolic result and a numeric result. See block 424. Next, at block 426, for elements in the list or matrix that should only be displayed symbolically, the method 400 shows the symbolic results in the numeric display of the list or matrix. The method then terminates execution. If the answer to the test at decision block 422 is NO, the method 400 proceeds to another continuation terminal ("terminal A2"), where it loops back to block 410 and the above-identified processing steps are repeated.

There are also many situations where both symbolic and numeric results are needed by the user, who must perform two steps to get them both in conventional mathematical software. For each user input (assuming no error in the input), various embodiments of the present invention echo the user input and display the symbolic result. When the numeric result is available and if it is appropriate to show it, various embodiments of the present invention also display the numeric result. When the target audience includes students, it is preferred that the user interfaces label the symbolic and numeric results as OUTPUT and DECIMAL OUTPUT, respectively, to avoid confusion.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for presenting mathematical calculations, comprising:
   employing a processor executing computer executable instructions stored on a computer readable storage medium to implement the following acts:
   receiving a mathematical expression as input to a computer-executable program; and
   displaying contemporaneously a symbolic result comprising at least one symbol, based at least in part on resolution of the mathematical expression by performing a symbolic calculation on the mathematical expression, and a numeric result comprising at least one floating point number, based at least in part on resolution of the symbolic result to the numeric result, which corresponds to the symbolic result, when the symbolic result and the numeric result are both obtainable and not identical to each other.

2. The method of claim 1, wherein the act of displaying comprising displaying the symbolic result when the numeric result is not obtainable due to the symbolic result containing the at least one symbol comprising at least one unknown variable.

3. The method of claim 1, wherein the act of displaying comprising displaying the symbolic result when the numeric result is not obtainable due to the numeric result being an error, infinity, or not a number.

4. The method of claim 1, wherein the act of displaying comprising displaying the symbolic result when the symbolic result is identical to the numeric result.

5. The method of claim 1, wherein the act of displaying comprising displaying a symbolic form of a list or a matrix based at least in part on determining that respective numeric results associated with respective elements in the list or the matrix is not to be shown, or displays both symbolic and numeric forms of a list or a matrix based at least in part on determining that at least one respective numeric result for at least one element in the list or the matrix is to be shown.

6. The method of claim 1, wherein the act of displaying comprising displaying contemporaneously a plurality of respective numeric results, based at least in part on a plurality of respective values applied to the mathematical expression comprising a function, and a plurality of respective symbolic results, based at least in part on a plurality of respective symbols or values applied to the mathematical expression.

7. A computation device for calculating mathematical expressions, comprising:
   a microprocessor on which a piece of software is executing for receiving a mathematical expression as input and for resolving the mathematical expression to its symbolic result and numeric result; and
   a display on which the input, the symbolic result, and the numeric result are simultaneously presented when the symbolic result and the numeric result are both obtainable and not identical to each other, the symbolic result comprising at least one symbol, the symbolic result determined based at least in part on a symbolic calculation performed on the mathematical expression to resolve the mathematical expression to the symbolic result, the numeric result comprising at least one of an integer or a floating point number, the numeric result determined based at least in part on resolution of at least one of the symbolic result or the mathematical expression to the numeric result, which corresponds to the symbolic result.

8. The computation device of claim 7, wherein the display includes a user interface screen in which an input is shown on a first line, a symbolic result is shown on a second line below the first line, and the numeric result is shown on a third line below the second line.

9. The computation device of claim 7, wherein the display includes a user interface screen in which an input is shown superjacent to a symbolic result and a numeric result, the symbolic result being adjacent to the numeric result.

10. The computation device of claim 7, wherein the display includes a user interface screen in which an input is shown adjacent to a symbolic result and the symbolic result is shown adjacent to the numeric result.

11. The computation device of claim 7, wherein the display includes a user interface screen in which a symbolic result is shown subjacent to an input and a numeric result, the input being shown adjacent to the numeric result.

12. A computer-readable storage medium having computer-executable instructions stored thereon for implementing a method for presenting mathematical calculations, wherein the instructions are executed on at least one processor, the method comprising:
   receiving a mathematical expression as input to a computer-executable program; and
   displaying contemporaneously a symbolic result comprising at least one symbol, based at least in part on resolution of the mathematical expression by performing a symbolic calculation on the mathematical expression, and a numeric result comprising at least one of an integer or a floating point number, based at least in part on resolution of the symbolic result to the numeric result, which corresponds to the symbolic result, when the symbolic result and the numeric result are both obtainable and not identical to each other.

13. The computer-readable storage medium of claim 12, wherein the act of displaying comprising displaying the symbolic result when the numeric result is not obtainable due to the symbolic result containing the at least one symbol comprising at least one unknown variable.

14. The computer-readable storage medium of claim 12, wherein the act of displaying comprising displaying the symbolic result when the numeric result is not obtainable due to the numeric result being an error, infinity, or not a number.

15. The computer-readable storage medium of claim 12, wherein the act of displaying comprising displaying the symbolic result when the symbolic result is identical to the numeric result.

16. The computer-readable storage medium of claim 12, wherein the act of displaying comprising displaying a symbolic form of a list or a matrix based at least in part on determining that respective numeric results associated with respective elements in the list or the matrix is not to be shown.

17. The computer-readable storage medium of claim 12, wherein the act of displaying comprising displaying both symbolic and numeric form of a list or a matrix based at least in part on determining that at least one respective numeric result for at least one element in the list or the matrix is to be shown.

* * * * *